United States Patent [19]

Siciliano

[11] 3,783,990
[45] Jan. 8, 1974

[54] END TO END EGG TRANSFER MECHANISM

[75] Inventor: Anthony J. Siciliano, Vineland, N.J.

[73] Assignee: Diamond International Corporation, New York, N.Y.

[22] Filed: Sept. 9, 1971

[21] Appl. No.: 179,003

[52] U.S. Cl. .............................. 198/20 R, 198/165
[51] Int. Cl. ............................................ B65g 47/00
[58] Field of Search...................... 198/165, 20, 102, 198/131, 82, 179

[56] References Cited
UNITED STATES PATENTS

| | | | |
|---|---|---|---|
| 2,805,755 | 9/1957 | Jones .............................. | 198/102 X |
| 2,971,443 | 2/1961 | Striplin .......................... | 198/165 X |
| 3,446,332 | 5/1969 | Bechtloff .......................... | 198/165 |

*Primary Examiner*—Evon C. Blunk
*Assistant Examiner*—Douglas D. Watts
*Attorney*—Karl W. Flocks

[57] ABSTRACT

A transfer mechanism for moving eggs or like objects across conveyor units disposed in end-to-end relationship comprising in combination with said units a flat plate disposed between the ends of said conveyor units to close up the inherent gap therebetween and an endless transfer belt member disposed over the transfer zone at the adjacent ends of said conveyor units to yieldably grasp eggs or like objects in sandwiched relationship with said conveyor units to move the eggs or like objects thereacross and with gentle release of said eggs or like objects. The transfer belt includes an egg engaging surface made of spongelike material and is disposed at a slight inclination with respect to the belts of said conveyor units.

4 Claims, 3 Drawing Figures

PATENTED JAN 8 1974 3,783,990

INVENTOR
ANTHONY J. SICILIANO

BY Karl W. Flocks

ATTORNEY

END TO END EGG TRANSFER MECHANISM

The present invention relates to the transportation of eggs over a great distance in an egg processing plant and more particularly to the transfer of eggs from one conveyor unit to a subsequent conveyor unit disposed in end-to-end relationship therewith.

In using conventional mechanisms for transferring eggs from conveyor unit to conveyor unit, egg processors have frequently experienced cracked or checked eggs which result in a substantially lower yield. The cracked or checked eggs generally are the result of the eggs colliding or scraping against each other in the transfer zone or their colliding against each other because of kicking or ejecting action of some transfer mechanisms.

Accordingly, it is an object of my invention to provide a novel end-to-end transfer mechanism which will move eggs gently from one conveyor belt to a subsequent conveyor belt.

Another object of my invention is to provide a novel end-to-end transfer mechanism which will gently release eggs which have been moved across a transfer zone from one conveyor belt upon a subsequent conveyor belt.

An additional object of my invention is to provide a novel end-to-end transfer mechanism which will firmly but yieldably grasp eggs in a sandwiched like relationship between a transfer belt and a first conveyor belt to transfer the eggs across the end of the first conveyor belt to a second conveyor belt with the transfer belt and second conveyor belt effecting a similar sandwich relationship with the eggs and then gently releasing the eggs upon the second conveyor belt.

Other objects and a fuller understanding of my invention may be had by referring to the following description and claims taken in conjunction with the accompanying drawing, in which:

In transporting eggs from station to station in an egg processing plant it is frequently necessary that the conveyor system comprise several conveyor units, particularly when the eggs are to be transported over a great distance. These conveyor systems may be made up of several units with each such unit being provided with its own drive member. When the conveyor units are placed end-to-end, means for transferring the eggs from one belt to another is necessary. It is conventional to place a flat plate-like bridge member between the conveyor ends to allow the eggs to move across the gap between the belts. Frequently, eggs are actually pushed across the flat plate by other eggs with the result that some eggs are cracked or checked and the yield for the processor is reduced thereby. In accordance with this invention a transfer is provided which allows the eggs to be sandwiched between the first conveyor belt and a sponge type transfer belt assembly that is located over the transfer zone. The transfer mechanism is arranged so as to grasp the egg before it reaches the flat plate area while it is in the transfer zone of the first conveyor belt, gently carry it over the flat plate area and gently release it on the subsequent conveyor belt. The novel transfer mechanism is arranged over the conveyor transfer area so as to grasp the eggs between the sponge belt assembly and the conveyor belt in sandwich-like relationship, to gently carry the eggs across the flat plate area and onto the next conveyor with the sponge belt gradually inclining up and away from the second conveyor belt and eventually disengaging the egg gently and completely. This diverging or inclining arrangement of the transfer belt from the second conveyor belt eliminates all sudden ejection of eggs, in contrast to when a sponge wheel or a plurality of sponge discs are used to push the eggs over a flat plate. The transfer mechanism in operation is driven at substantially the speed of the adjacent cooperating portions of the conveyor belts by any conventional power take-off belt and pulley arrangement (not shown) from one of the conveyor units.

Figure 1:
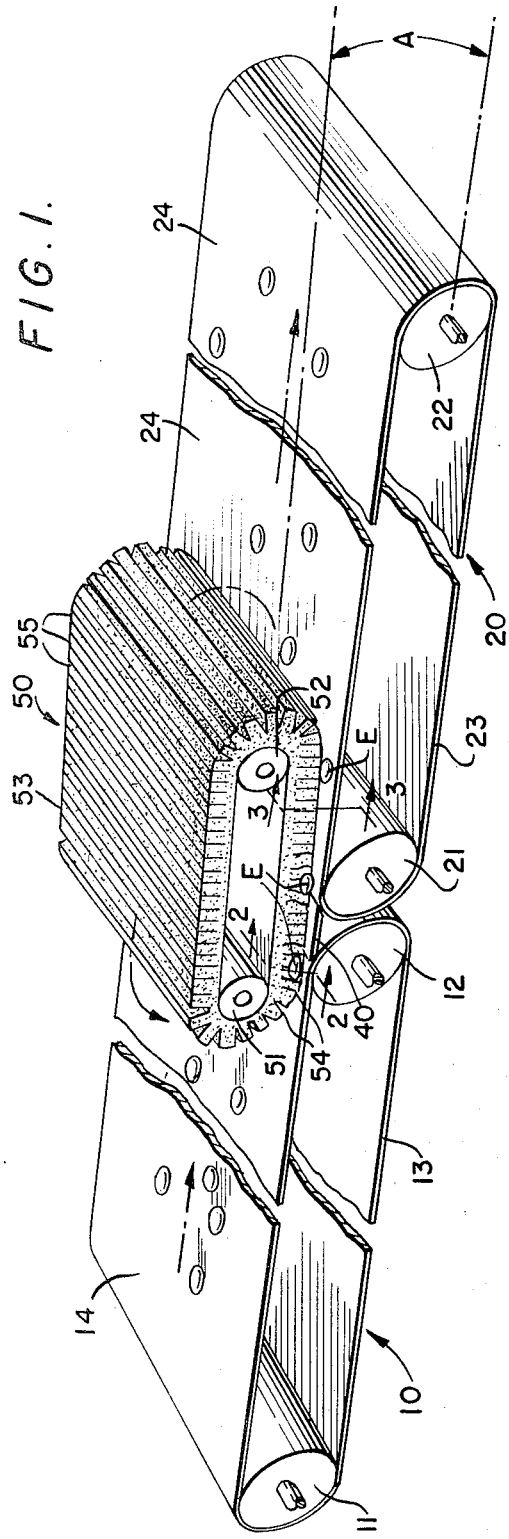
FIG. 1 is an elevational view in perspective of the end-to-end transfer mechanism constituting my invention in combination with a pair of conveyor units disposed in end-to-end relationship.

Referring now more particularly to the drawing, the novel transfer mechanism comprising the present invention cooperates in combination with a pair of endless conveyor belt units 10 and 20, respectively, as shown in FIG. 1. The endless conveyor belt assembly 10 comprises a pair of spaced apart roller members 11 and 12 over which are trained an endless conveyor belt 13 with an upper egg transporting run 14. The endless conveyor belt unit 20 similarly comprises a pair of spaced roller members 21 and 22 with an endless conveyor belt 23 trained over the roller members 21 and 22. The conveyor belt 23 includes an upper egg transporting run 24. In each of the conveyor units 10 and 20 one of the roller members 12 and 22, respectively, may be power driven, so that the belts move in the direction of the arrows in FIG. 1.

It is noted that the adjacent roller members 12 and 21 of the conveyor units 10 and 20, respectively, to operate properly must be spaced apart from each other to avoid intereference at the adjacent arcuate portions of upper runs 14 and 24 and because of the required spacing of these roller members, articles transferred from conveyor belt unit 10 to conveyor unit 20 would be likely to drop into the space between rollers 12 and 21. To prevent articles from dropping between rollers 12 and 21 it has been conventional to provide an intermediate plate or bridge 40 over which articles may be moved across from conveyor belt unit 10 to conveyor belt unit 20. It frequently happens that with only the plate 40 provided between rollers 12 and 21 articles moving thereacross have a tendency to either slow down or completely stop on this plate and must be pushed across by following articles. Accumulation of articles on plate 40 is undesirable for several reasons. For one thing continuity of movement of the articles is lost, but more importantly when the articles that are conveyed are eggs they may become checked or cracked and thus reduce the yield for the processor.

Figure 3:
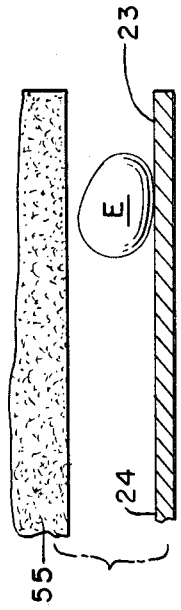
FIG. 3 is an enlarged elevational view in section taken along the plane of 3—3 in FIG. 1.
Figure 2:
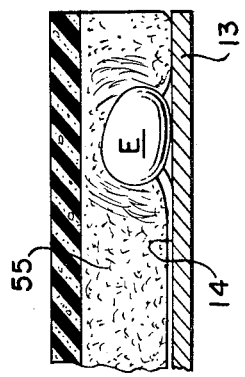
FIG. 2 is an enlarged elevational view in section taken along the plane of 2—2 in FIG. 1.

The transfer mechanism 50 which comprises a pair of spaced apart pulley members 51 and 52 and an endless belt 53 trained thereover to cooperate with belts 13 and 23 to yieldably sandwich eggs moved along the upper run 14 of conveyor belt 13 and carry the eggs across plate 40 to the upper run 24 of conveyor belt 23. The endless belt 53 comprises a yieldable egg engaging surface and may take the form of a plurality of foam or sponge-like sections 55 which yieldably compress the egg designated E, between a lower run 54 thereof and an upper run 14 of belt 13. It is noted that the centers of rollers 11, 12, 21, and 22 are located generally in a horizontal plane but the centers of pulley 51 and 52 are at a slight angle A to the horizontal diverging from unit 10 toward unit 20. The divergence between the lines of centers or angle A as shown in FIG. 1 is such that shortly after an egg E is moved over to the upper run 24 of conveyor assembly 20 it is released from the grip of sections 55 of the belt 53. In this manner the eggs are gently released onto the upper run 24 instead of being kicked out or ejected in contrast with what might occur if the egg engaging surface 54 of belt 53 did not gradually move away from the upper run 24 of belt 23. The relationship between the sponge or foam pads 55 and the upper run 14 of belt 13 is more clearly seen in FIG. 2 in which an egg E is gripped therebetween. Similarly, the relationship between the foam pads 55 and the upper run 24 of the belt 23 is more clearly seen in FIG. 3 in which an egg is carried on the upper run 24 of belt 23, but free from the grip of pads 55.

In a conveyor system it is not unusual to have a series of belt units similar to 10 and 20 in which case additional transfer belt mechanisms 50 would be necessary.

In systems as described above, the width of the belt 13 may be from eight to twelve inches with the distance over which the eggs are to be conveyed being several hundred feet, thus necessitating a plurality of conveyor units 20, 30, etc. Along with the foregoing the width of belt 63 would also be between 8 and 12 inches and the distance between centers of pulleys 51 and 52 is in the order of 12 to 18 inches. Thus it is clear that several eggs may be simultaneously gripped between any one foam pad 55 and a cooperating conveyor belt run.

The transfer belt mechanism 50 is power driven at substantially the same speed as the cooperating transporting runs 14 and 24, for example, by conventional power take-off means from either roller 12 or 21 to effectively grip eggs with the upper run 14 to transfer them over plate 40 to the upper run 24 of belt assembly 20.

It is to be understood that while the preferred embodiment of the present invention has been illustrated and described herein, numerous variations and modifications therein may occur to those having skill in this art and what is intended to be covered herein is not only the illustrated form of the invention, but also any and all modified forms thereof that may come within the spirit of this invention.

What is claimed is:

1. In an egg conveyor system comprising a series of at least a first and a second endless conveyor belt disposed in end-to-end relationship with an upper egg carrying run of each of said belts being in substantial coplanar relationship and a plate member, over which eggs must pass in moving from said first belt to said second belt, bridging a space between adjacent arcuate portions of said upper conveyor belt runs, the improvement comprising an endless transfer belt assembly including an endless transfer belt disposed above said two conveyor belts with a lower run passing over portions of said upper runs of said conveyor belts prior to the transfer zone of the first conveyor belt to just after the transfer zone of said second conveyor belt and cooperating with said upper runs of said conveyor belts and said plate member to grasp eggs therebetween and transfer them from said first conveyor belt and over said plate member to said second conveyor belt, said transfer belt including a yieldable egg engaging surface in the form of a plurality of foam pads, a lower run extending at a slight inclination with respect to the plane of the upper runs of said two conveyor belts such that it diverges from said first conveyor belt to said second conveyor belt as it moves in the same general direction that the upper runs of said first and second conveyor belts move with an initial arcuate end of the lower run of said transfer belt being spaced above said first conveyor belt such a distance that it may effectively grasp an egg moving therebelow on the first conveyor belt in sandwiched relationship with said first conveyor belt and cooperatively move it onto said transfer plate, move it across said transfer plate, move it along with an initial portion of said second conveyor belt and gently release the egg onto said second conveyor belt by reason of said inclination, and each of said conveyor belts having its own drive unit.

2. In an egg conveyor system comprising a series of at least a first and a second endless conveyor belt disposed in end-to-end relationship with an upper egg carrying run of each of said belts having its own drive unit and being in substantial coplanar relationship and a plate member, over which eggs must pass in moving from said first belt to said second belt, bridging a space between adjacent arcuate portions of said upper conveyor belt runs, the improvement comprising an endless transfer belt assembly including an endless transfer belt disposed above said two conveyor belts with a lower run passing over portions of said upper runs of said conveyor belts prior to the transfer zone of the first conveyor belt to just after the transfer zone of said second conveyor belt and cooperating with said upper runs of said conveyor belts and said plate member to grasp eggs therebetween and transfer them from said first conveyor belt and over said plate member to said second conveyor belt, said transfer belt including a yieldable egg engaging surface, and a lower run extending at a slight inclination with respect to the plane of the upper runs of said two conveyor belts such that it diverges from said first conveyor belt to said second conveyor belt as it moves in the same general direction that the upper runs of said first and second conveyor belts move with an initial arcuate end of the lower run of said transfer belt being spaced above said first conveyor belt such a distance that it may effectively grasp an egg moving therebelow on the first conveyor belt in sandwiched relationship with said first conveyor belt and cooperatively move it onto said transfer plate, move it across said transfer plate, move it along with an initial portion of said second conveyor belt and gently release the egg onto said second conveyor belt by reason of said inclination.

3. The conveyor system of claim 2 wherein the yieldable egg engaging surface of said transfer belt is made of a sponge like material.

4. The conveyor system of claim 2 wherein the yieldable egg engaging surface of said transfer belt is in the form of a plurality of foam pads.

* * * * *